United States Patent [19]

Yoshida

[11] Patent Number: 4,553,896
[45] Date of Patent: Nov. 19, 1985

[54] TRUCK APPARATUS FOR CONVEYING PARTS

[75] Inventor: Seiki Yoshida, Aichi, Japan

[73] Assignee: Toyota Jidosha Kabushiki Kaisha, Toyota, Japan

[21] Appl. No.: 455,552

[22] Filed: Jan. 4, 1983

[51] Int. Cl.$^4$ .............................................. B60P 1/02
[52] U.S. Cl. ..................................... 414/495; 104/48; 414/222; 414/911
[58] Field of Search ................... 104/48; 414/495, 910, 414/911

[56] References Cited

U.S. PATENT DOCUMENTS

| | | | |
|---|---|---|---|
| 912,005 | 2/1909 | Lehman et al. | 104/48 |
| 3,448,693 | 6/1969 | Graham | 104/48 |
| 3,889,831 | 6/1975 | Davis | 414/911 X |
| 4,057,018 | 11/1977 | Laurent et al. | 104/48 |
| 4,131,206 | 12/1978 | Kawada et al. | 414/911 X |

FOREIGN PATENT DOCUMENTS 1444836 8/1976 United Kingdom ................ 414/911

Primary Examiner—Randolph A. Reese
Attorney, Agent, or Firm—Cushman, Darby & Cushman

[57] ABSTRACT

A truck apparatus for conveying parts includes supply rails laid to reach a delivering position for the parts, rails for a shift car laid perpendicularly to the supply rails, rails for two trucks to be coincided with the supply rails mounted at an interval on the shift car, and bearers for the parts each having a cradle roller placed on the rails for the truck. Each of the trucks includes lifters to vertically displace the bearers on the trucks. When one of the rails for the trucks on the shift car are disposed at a position to be coincided with the supply rails, the positions of right and left sides of the supply rails corresponding to the positions occupied by the other of the rails for the trucks are positions to be placed with the parts on the two bearers for the parts. Thus, the receiving and delivering preparation times of the parts and the transferring time of the truck between the rails can be shortened by simultaneously conducting the transferring work of the trucks between the supply rails and the rails on the shift car, thereby improving the working efficiency.

1 Claim, 2 Drawing Figures

TRUCK APPARATUS FOR CONVEYING PARTS

BACKGROUND OF THE INVENTION

This invention relates to a truck apparatus for conveying parts or the like such as coils and, more particularly, to an improvement in a truck apparatus used for conveying parts such as coil holders or the like from their receiving position to their take-up position and delivering the parts.

A conventional truck apparatus for conveying parts has a composite facility including in combination a truck with a lifter which travels to a position for delivering parts and a truck with a cradle roller capable of transferring perpendicularly from the truck, and loads the parts on the truck and delivers the parts to a part holder or the like. This conventional apparatus has such drawbacks and disadvantages that, in case that parts can be loaded on the truck with the cradle roller when the truck is disposed at its standby position, it cannot adjust, when the truck is operating, the position to the height of delivering the parts, causing wasteful time for preparation of adjusting the part delivering height, part transferring work of next truck with a cradle roller cannot be started after the truck with the cradle roller placed on the truck with the lifter is unloaded from the truck with the lifter, and there are losses in the loading and unloading times of the truck with the cradle roller because the loading and unloading of the trucks with the cradle rollers cannot be simultaneously conducted. Further, a power cable of the truck with the cradle roller is moved along a complicated route, and thus accidental breakage of the cable tends to occur.

SUMMARY OF THE INVENTION

Accordingly, an object of this invention is to provide a truck apparatus for conveying parts which can shorten the receiving and delivering preparation times of parts and the transferring time of a truck between rails by simultaneously conducting the transferring work of the trucks between supply rails and rails on a shift car, thereby improving the working efficiency.

Another object of this invention is to provide a truck apparatus for conveying parts which can remarkably reduce the cause of an accident such as breakage of a cable and a hose by transferring the shift car and the truck in a simple linear motion, thereby displacing a drive cable bearer in a simple motion.

Still another object of this invention is to provide a truck apparatus for conveying parts which can complete the preparation work of receiving and loading the parts while a truck is disposed at its standby position.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

An embodiment of the present invention will now be described in more detail with respect to the case of supplying a coil as one of parts to a coil holder with reference to the accompanying drawings.

Figure 1:
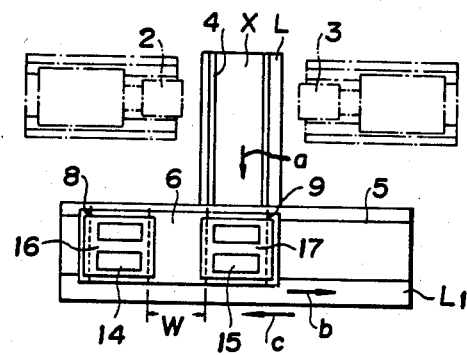
FIG. 1 is a plan view of an embodiment of a truck apparatus for conveying parts according to the present invention.

Supply rails 4 are laid to permit a coil 1 (as shown by a chain line in FIG. 2) to be moved to a position X so as to deliver the coil 1 to coil holders 2 and 3. As shown in FIG. 1 supply rails 4 are laid so as to form a crossing with rails 5 for a shift car 6, the purpose of which will be described in greater detail later.

The rails 5 are laid perpendicularly to the rails 4. In the embodiment shown in the drawings, the rails 5 are laid on a surface $L_1$ which is lower in a depth l than the surface L on which the rails 4 are laid.

The shift car 6 is placed on the rails 5 so as to be moved toward both rightward and leftward directions of the rails 4. Reference numeral 7 denotes wheels.

Two sets of rails 8 and 9 occupy positions which alternately coincide with the rails 4 and are mounted at an interval W on the shift car 6. Trucks 10 and 11 are placed via wheels 12 and 13 on the rails 8 and 9.

Bearers 16 and 17 for the coils 1 of parts respectively having cradle rollers 14 and 15 are respectively mounted via lifters 18 and 19 on the trucks 10 and 11.

Figure 2:
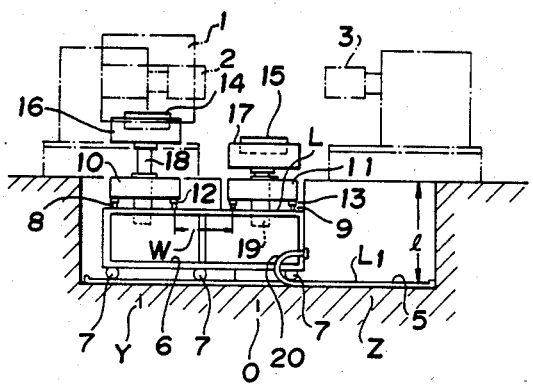
FIG. 2 is a front view of part of the apparatus longitudinally taken.

The lifters 18 and 19 respectively operate to lift the coils 1 of parts placed on the cradle rollers 14 and 15 on the bearers 16 and 17 of the trucks 10 and 11 until the coils 1 coincide with the positions of the coil holders 2 and 3, as shown by chain lines 1 in FIG. 2.

The abovementioned shift car 6 can be moved on the rails 5 so that two sets of rails 8 and 9 alternately coincide with the rails 4. As shown in FIG. 1, when the one set of rails 9 for the one truck coincide with the position of the rails 4, and the truck 11 travels onto the rails 4 the coil 2 of parts is disposed in a state to be delivered to the coil holder 3, whereas the position of the rails 8, and hence the truck 10 on the rails 8, is in a position to be placed with a new coil 1 of parts on the cradle roller 14 on the lowered bearer 16.

On the other hand, when the rails 8 are brought into a position so as to be coincident with the rails 4, the rails 9 for the other truck (and hence the truck 11 on the rails 9) occupy a position wherein a new coil 1 can be placed on the cradle roller 15 of the lowered bearer 17. Reference numeral 20 in FIG. 2 depicts a cable bearer for moving a drive cable, or the like.

When truck 11 is moved on the rails 4 in a direction as designated by an arrow a, a coil 1 can be placed on the bearer 16 of the truck 10 at its standby position Y (e.g. as shown in FIG. 1), truck 11 can then load its coil 1 into position on the coil holder 2 by the lifter 18. Thereafter the truck 11 is transferred from the rails 4 to the rails 9 on the shift car 6, and is stopped at a predetermined position. Then, the shift car 6 is moved in a direction as designated by an arrow b, the rails 9 are removed from the rails 4, while the rails 8 are brought into the position where they coincide with the rails 4.

After the shift car 6 is stopped, the truck 10 immediately starts moving, transfers from the rails 8 to the rails 4, moves to the delivering position X in a direction reverse to the arrow a, and stops so as to deliver the coil 1 to the coil holder 2. In the meantime, the rails 9 and accordingly the truck 11 is brought to the standby position designated by the position Z (see FIG. 2). Therefore, a new coil 1 is placed on the bearer 17 at that place, the coil 1 is then loaded to the position of the coil holder 3, and the preparation work is thus completed.

When the delivery of the coil 1 on the truck 10 is completed, the truck 10 is moved similarly in a direction of the arrow a as described above, the truck 10 transfers to the rails 8 for the shift car 6, and stops. Then the shift car 6 moves in a direction of the arrow c, and the rails 9 are again brought to the position 0 where they again coincide with the rails 4.

According to the present invention as described above with respect to the structure and the operation of the truck apparatus, the prepatory work for receiving and loading parts can be completed while the truck is disposed at a standby position, the transfer work of the two trucks between the supply rails and the rails for the truck on the shift car can be simultaneously loaded and unloaded to thereby shorten the loading and unloading time of the trucks, and the preparation time and the loading and unloading time of the trucks can be remarkably shortened, thereby improving the working efficiency.

Further, the shift car and the trucks move merely in a simple linear motion. Therefore, the drive cable bearer 20 shown in FIG. 2 is displaced merely in a simple linear motion. Thus, accidental breakage of cable and the like can be remarkably reduced.

What is claimed is:

1. A truck apparatus for conveying parts to a holder for receiving the parts, said truck apparatus comprising:

first supply rails laid between an end position and a delivering position for the parts, second supply rails laid perpendicularly to said first supply rails and downwardly vertically displaced relative to the end position of said supply rails, a shift car longitudinally movably coupled to said second supply rails so as to be movable alternatively between first and second lateral positions, said shift car including third and fourth rail sets laid perpendicularly to said second supply rails, said third and fourth rail sets each being parallel to and at the same height as said first supply rails, said third and fourth rail sets being aligned with said first supply rails when said shift car is longitudinally alternatively moved between said first and second lateral positions, respectively, a pair of trucks movably positioned on respective ones of said third and fourth rail sets so that said pair of trucks is alternately movable onto said first supply rails between said end and delivering positions when said shift car is longitudinally alternately moved between said first and second lateral positions, each said truck including a bearer for the parts having a cradle roller and lifter means for lifting the cradle between a lowered position to accept the parts thereon and a raised position for transferring the parts to the holders when the truck is in said delivering position, said apparatus further comprising cable bearer means having one end fixed to said shift car and another end disposed relative to said second supply rails such that said cable bearer means, between said one and other ends, is adjacently parallel to said second supply rails for permitting a drive cable to be moved responsive to movement of said shift car between said first and second lateral positions, said one end of said cable bearer means being vertically spaced above said second supply rails to define a vertical bend portion in said cable bearer means, said cable bearer means, by virtue of said vertical bend, thereby linearly moving adjacently parallel to said second supply rails.

* * * * *